Patented Feb. 14, 1950

2,497,689

UNITED STATES PATENT OFFICE 2,497,689

PROCESS OF MODIFYING FATTY OILS

Sol B. Radlove, Newton, Iowa, assignor to The Maytag Company, Newton, Iowa, a corporation of Delaware No Drawing. Application January 7, 1947,
Serial No. 720,683

4 Claims. (Cl. 260—405.6)

The present invention relates to the treatment of fatty oils and especially to a novel process for the treatment of fatty oils containing polyethenoid fat acids and particularly to those having three non-conjugated double bonds, such as linseed, perilla and the like oils, to thereby decrease the tendency of these oils to after-yellow.

It is known that protective coatings, including paint, varnishes and enamels, prepared from certain oils, such as linseed, perilla and the like, exhibit the objectionable property known as after-yellowing; that is, paints, varnishes or enamels incorporating these oils will when dried gradually acquire a yellow color. The only known method of preparing paints and enamels possessing no tendency to after-yellow is to employ oils which do not contain fat acids having three or more double bonds. However, oils having two double bonds with a very small percentage of three or more double bonds are sometimes considered to have no after-yellowing because the change in color after drying is so slight that it is not considered objectionable, and it is to the production of this particular type of oil that this invention is primarily directed.

Drying oils are employed as components of protective coatings, such as paints, enamels and the like, because of their ability to polymerize or dry after they have been applied to a surface to form tough adherent films. The film forming properties of oils are closely related to their degree of unsaturation, since it is through the unsaturated centers or double bonds that polymerization and drying occurs. Until quite recently, the value of drying oils was judged almost entirely by their iodine numbers or values. Lately, however, the protective coating industry has found that the value of drying oils depends not wholly on the iodine number or the degree of unsaturation but also upon the importance of other contributing factors, including the percentage of conjugated fat acids present in the drying oils, the type of ester structure and the percentage of various isomers of the unsaturated fat acids present.

Among the objects of the present invention is the provision of a novel process of treating fatty oils having three double bonds in the fat acid radicals whereby to decrease after-yellowing tendencies of the oil so treated.

The present novel invention further comprehends a novel process and manner of producing a rapid drying oil which when added to other components of paints, enamels and the like, gives thereto improved properties including an increase in the drying rate of the treated oil, and also an increase in its resistance to water and dilute alkali solutions.

Further objects, advantages and capabilities will later more fully appear and are inherently possessed thereby.

The yellowing of paint films containing certain oils is attributed to the presence of fat acids containing substantial amounts of three or more double bonds in the fat acid radicals; for example, to linolenic acid (9, 12, 15-octadecatrienoic acid) present in linseed and perilla oils and to clupanodonic acid (a docosopentanoic acid) present in sardine and menhaden oils. These fat acids are highly unsaturated and constitute the main drying constituents of the above mentioned oils, hence they cannot be removed if the oil is to retain its drying properties.

I have discovered that the after-yellowing tendencies of linseed and perilla oils and the like can be substantially decreased or eliminated by selectively hydrogenating the major portion of the highly unsaturated fat acids present to yield fat acids of the linoleic acid series having two non-conjugated double bonds in the fat acid radicals. This acid still possesses drying properties but does not tend to after-yellow. It is not necessary to convert all of the unsaturated fat acids containing three double bonds to fat acids containing only two double bonds because an oil incorporating a small percentage of fat acids containing three or more double bonds will not after-yellow objectionably.

When a fatty oil is hydrogenated its unsaturation is decreased. Ordinarily, as the unsaturation of a fatty oil is decreased its drying rate is likewise decreased. I have discovered that this may be overcome by catalytically isomerizing the di-unsaturated non-conjugated double bonds in the fat acids to a conjugated form, a treatment which increases the water and alkali resistance. I have further discovered that the two reactions, hydrogenation and isomerization, can be carried out in any sequence, that is, the oil may be hydrogenated followed by isomerization, or isomerized followed by hydrogenation, or if specific types of catalysts are used, for example, a nickel on activated carbon catalyst, both hydrogenation and isomerization may be carried out simultaneously.

I have discovered that this type of catalyst will both hydrogenate and isomerize at will depending on the operating conditions and hence I prefer its use, but I do not wish to limit my process to the use of this catalyst exclusively, for any catalyst or combination of catalysts which are capable of selectively hydrogenating and/or isomerizing an oil can be employed in my process.

The chemical transformation involved in my process may be clearly illustrated with the following series of equations using linolenic acid, present in substantial amounts in a large portion of drying oils, as a specific example. When I selectively hydrogenate linseed or perilla oil under the conditions hereinafter set forth, I apparently saturate a substantial portion either of the double bonds between the 15–16 or 9–10 carbon atoms occurring in the linolenic acid present in the oil, thus yielding two isomeric linoleic acids (9, 12 and/or 12, 15-octadecadienoic acid).

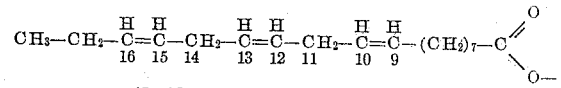

(9, 12, 15 linolenic acid radical)

*Selective hydrogenation*

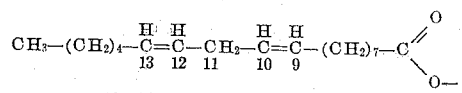

(9, 12, linoleic acid radical)

and/or

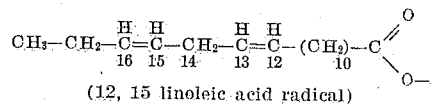

(12, 15 linoleic acid radical)

I next subject the partially hydrogenated oil to isomerizing conditions and rearrange a substantial portion of the non-conjugated double bonds or isomers in the linoleic acids to conjugated isomers, and this arrangement increases the drying rates of these fat acids. This isomerizing not only acts on the fat acids which were converted by selective hydrogenation but also on the di-unsaturated non-conjugated double bonds which are normally present in fat acids in combination with linolenic acid and other constituents in various oils.

The following examples will serve to illustrate the manner of practicing my invention, although it is to be understood that the invention is not limited thereto nor to the detailed disclosure therein given:

*Example I*

A catalyst was prepared consisting of 100 grams of activated carbon (Nuchar C-190) mixed thoroughly with a solution comprising 116 grams of nickel nitrate in 160 milliliters of water and dried at 100° C.

27 grams of this catalyst composition was activated by reducing with hydrogen at 360° C. for two hours, after which it was cooled to below 150° C. This catalyst was placed in a closed container and mixed with 300 grams of alkali refined linseed oil. The mixture was continuously stirred and heated and maintained at 130°–140° C. with hydrogen gas bubbling through the mixture for three hours. This flowing of hydrogen through the mixture acts with the catalyst to selectively hydrogenate a linolenic acid radical in the oil to a form of linoleic acid as shown in the previously mentioned formula. The hydrogen was then replaced with carbon dioxide gas to provide an inert atmosphere and the temperature of the oil was raised to 170° C. and held there for 3¼ hours. At this temperature the catalyst reacts with the remaining polyethenoid acid present in the oil to isomerize a large portion of the non-conjugated double bonds to a conjugated form to thereby produce an improved drying oil. The refractive index (25° C.) before treatment=1.4777. After selective hydrogenation the refractive index=1.4812. After isomerization the refractive index=1.4832. The refractive index rose during the hydrogenation because some isomerization was occurring simultaneously despite the low temperature employed. (Isomerizing an oil increases, while hydrogenation decreases, the refractive index.) The viscosity increased from A to E (Gardner-Holdt scale).

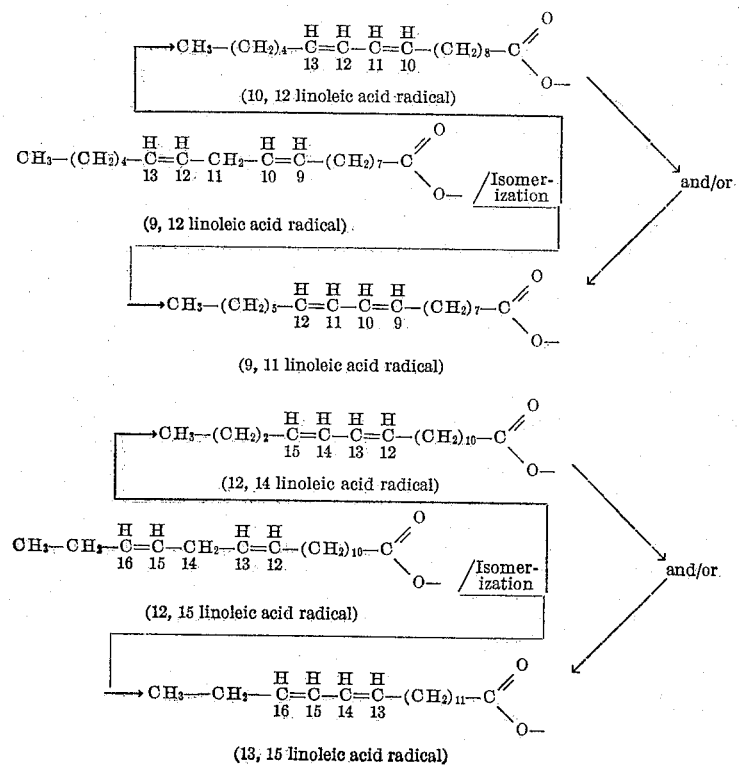

In order to illustrate the improvement resulting from the above treatment, a white paint was made from this oil and compared with a similar paint prepared from alkali-refined linseed oil. 50 grams of oil was ground in a small paint mill with 85 grams of basic carbonate of white lead. For driers 0.3 per cent lead and 0.03 per cent manganese (per cent metal based on the weight of oil) was added as the naphthenates. The paint prepared using the alkali-refined linseed oil dried (set-to-touch) in five hours and twenty minutes, while the paint prepared from the novel modified linseed oil dried (set-to-touch) in two hours and fifteen minutes. After thirteen days the paint prepared from the modified oil of the present invention showed no yellowing tendency, while the paint prepared from the alkali-refined linseed oil had yellowed objectionably.

The following example is given in order to illustrate the fact that my process may be carried out in the reverse sequence from that used in Example I.

*Example II*

27 grams of catalyst composition prepared according to disclosure in Example I, after reduction, was mixed with 300 grams of alkali-refined linseed oil in a closed container and with continuous stirring was heated and maintained at 170° to 172° C. for four hours with carbon dioxide gas bubbling through the mixture. The carbon dioxide provides the inert atmosphere and the catalyst reacts with the oil at this temperature to isomerize a large portion of the non-conjugated double bonds to conjugated form. The carbon dioxide after this time period was then replaced with hydrogen gas and the mixture heated for two additional hours at 170° C. to selectively hydrogenate a large portion of the fat acids having three or more double bonds to produce fat acids having two double bonds. The refractive index (25° C.) before treatment=1.4777. After isomerization the refractive index=1.4872. After selective hydrogenation the refractive index=1.4821. The viscosity rose from A to F (Gardner-Holdt scale). Basic carbonate of white lead paints were prepared from this oil and from alkali-refined oil as in Example I. The paint prepared from the alkali-refined linseed oil dried in five hours and fifteen minutes, while that prepared from the novel modified linseed oil dried in three hours and twenty minutes. In addition, paint prepared using the alkali-refined linseed oil yellowed badly after fifteen days, while that prepared from the modified oil of the present invention exhibited no after-yellowing tendency.

In the above example, the procedure may be reversed, that is, the hydrogen gas can be used first. In this case both hydrogenation and isomerization will occur simultaneously in the first step. When the hydrogenation step is completed to the desired value the hydrogen is removed, isomerization is continued until the proper conjugation of the product is attained.

In order to further demonstrate the value of the modified oils over the untreated oils, the following example is given:

*Example III*

Two thirty gallon oil length varnishes employing a maleic-modified rosin as the resin were prepared from alkali-refined linseed oil and from the novel modified linseed oil treated according to Example I. The varnishes were prepared as follows: All of the oil and resin were heated in an open vessel to 575° F. and polymerized to the desired body. The "cook" was then cooled to 350° F. and reduced with thinner (mineral spirits) to 50 per cent non-volatile. Naphthenate driers were added in the following amounts: 0.3 per cent lead, 0.03 per cent cobalt and 0.02 per cent manganese (metal based on the weight of oil used). The characteristics of the two varnishes are given below:

| Characteristics | Modified Linseed Oil Varnish | Alkali-refined Linseed Oil Varnish |
| --- | --- | --- |
| Total time of cook | 165 minutes | 186 minutes. |
| Viscosity—50% non-volatile Gardner Scale | G–H | F. |
| Color—50% non-volatile Gardner Scale | 13–14 | 11–12. |
| Set-to-Touch Time | 3 Hours 50 Min | 4 Hours 15 Min. |
| Dry Hard | Overnight | Overnight. |

Tin panels (31 gauge) were flo-coated with the varnishes and allowed to dry for seventy-two hours at room temperature. The films of both varnishes when immersed in hot or cold water exhibited practically the same water resistance.

Test tubes were dip-coated with the varnishes. They were inverted, allowed to drain and dry for one week. The coated tubes were then immersed in a 1 per cent solution of sodium hydroxide. The modified linseed oil varnish held up much better than the unmodified linseed oil varnish indicating superior alkali-resistance and it had the further advantage in that the after-yellowing tendency was reduced materially.

Similar results may be obtained with other oils such as perilla and the like, when subjected to the hereinbefore described treatments of selective hydrogenation and isomerization.

From the foregoing it can be seen that a process for modifying fatty oils containing a substantial portion of fat acids having three non-conjugated double bonds in the fat acid radicals may be reacted with a suitable catalyst to selectively hydrogenate a large portion of the fat acids containing the three double bonds to yield fat acids containing two non-conjugated double bonds without effecting the di-unsaturated fat acid radicals normally present in the oil and that after hydrogenation the product may be subjected to continued treatment with the same catalyst to isomerize a substantial portion of the di-unsaturated non-conjugated double bonds into isomers having a conjugated form. Also, that the procedure in this process may be reversed, and under certain conditions both hydrogenation and isomerization take place simultaneously.

Having thus disclosed my invention, I claim:

1. A process for modifying a fatty oil containing di-unsaturated non-conjugated fat acid radicals and at least twenty per cent of fat acids having three non-conjugated double bonds in the fat acid radicals, which consists in the steps of selectively hydrogenating in the presence of a catalyst composed of nickel on activated carbon a major portion of all but two of the double bonds occurring in the fat acid radicals having three double bonds, and isomerizing in the presence of the same catalyst to a conjugated system of double bonds at least fifty per cent of the two remaining double bonds in the said selectively hydrogenated fat acid radicals and in the di-unsaturated fat acid radicals originally present in the oil, to produce an oil of improved properties for protective coatings.

2. A process for modifying a fatty oil containing linoleic acid and at least twenty per cent linolenic acid, which consists in the steps of selectively hydrogenating in the presence of a catalyst composed of nickel on activated carbon at least ninety per cent of all but two of the double bonds occurring in the linolenic acid radicals to yield linoleic acid, and isomerizing in the presence of the same catalyst to a conjugated system of double bonds at least fifty per cent of the newly formed linoleic acid and the linoleic acid originally present in the oil, to produce an oil of improved properties for protective coatings.

3. A process for modifying linseed oil to produce an oil of improved properties for use in protective coatings, comprising selectively hydrogenating a major portion of all but two of the double bonds occurring in the fat acid radicals having three non-conjugated double bonds by heating the oil at a temperature of approximately 130°–140° C. for several hours and passing hydrogen therethrough during such period, and then of isomerizing to a conjugated system of double bonds the major portion of the two remaining double bonds in the said selectively hydrogenated fat acid radicals and in the di-unsaturated fat acid radicals originally present in the oil by heating the oil at a temperature of approximately 170° C. for several hours in an inert atmosphere, said selective hydrogenation and isomerization being in the presence of a catalyst of nickel on activated carbon.

4. A process for modifying linseed oil whereby to produce an oil of improved properties for protective coatings, comprising the steps of selectively hydrogenating at least ninety per cent of all but two of the double bonds occurring in the fat acid radicals having three non-conjugated double bonds by heating the oil at a temperature of approximately 130–140° C. for several hours and passing hydrogen therethrough during such period, isomerizing to a conjugated system of double bonds the major portion of the two remaining double bonds in the said selectively hydrogenated fat acid radicals and in the di-unsaturated fat acid radicals originally present in the oil by heating the oil at a temperature of approximately 170° C. for several hours in an inert atmosphere, and utilizing a catalyst of nickel on activated carbon in both the hydrogenating and isomerizing steps of the process.

SOL B. RADLOVE.

REFERENCES CITED

The following references are of record in the file of this patent:

UNITED STATES PATENTS

| Number | Name | Date |
|---|---|---|
| 2,014,999 | Barradas | Sept. 17, 1935 |
| 2,119,141 | Ralston et al. | May 31, 1938 |
| 2,127,716 | Brücke | Aug. 23, 1938 |
| 2,164,291 | Jenness | June 27, 1939 |
| 2,242,230 | Burr | May 20, 1941 |
| 2,302,994 | Gwynn | Nov. 24, 1942 |
| 2,320,063 | Borkowski | May 25, 1943 |